US010117160B2

(12) United States Patent
Zhu et al.

(10) Patent No.: US 10,117,160 B2
(45) Date of Patent: Oct. 30, 2018

(54) SCANNING FOR A PREFERRED NETWORK DURING AN ACTIVE CONNECTION TO ANOTHER NETWORK

(71) Applicant: Verizon Patent and Licensing Inc., Arlington, VA (US)

(72) Inventors: Lily Zhu, Parsippany, NJ (US); Xin He, Basking Ridge, NJ (US); Jignesh S. Panchal, Somerset, NJ (US); Andrew E. Youtz, Princeton, NJ (US); Kyriaki Konstantinou, New York, NY (US); Joseph Peter Kuhn, III, Hamilton, NJ (US); Xin Wang, Morris Plains, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 503 days.

(21) Appl. No.: 14/715,255

(22) Filed: May 18, 2015

(65) Prior Publication Data

US 2016/0227475 A1     Aug. 4, 2016

Related U.S. Application Data

(60) Provisional application No. 62/111,504, filed on Feb. 3, 2015.

(51) Int. Cl.
*H04W 48/12* (2009.01)
*H04W 48/16* (2009.01)
*H04W 48/18* (2009.01)

(52) U.S. Cl.
CPC ............ *H04W 48/16* (2013.01); *H04W 48/18* (2013.01)

(58) Field of Classification Search
CPC .............................. H04W 48/16; H04W 48/18
See application file for complete search history.

(56) References Cited

U.S. PATENT DOCUMENTS

| | | | | |
|---|---|---|---|---|
| 6,944,143 B1* | 9/2005 | Bayley | .................. | H04W 48/20 370/331 |
| 8,271,025 B2* | 9/2012 | Brisebois | .............. | H04W 48/16 455/552.1 |
| 2006/0116104 A1* | 6/2006 | Yang | ..................... | H04W 48/16 455/403 |
| 2010/0297995 A1* | 11/2010 | Macias | ................. | H04W 48/16 455/435.2 |
| 2012/0275371 A1* | 11/2012 | Somasundaram | .... | H04W 48/20 370/312 |

(Continued)

*Primary Examiner* — Meless Zewdu
*Assistant Examiner* — Alexander Yi

(57) ABSTRACT

When connected to an alternate network, a user device may search for a preferred network when the user device is actively transmitting traffic via the alternate network. As such, the user device may search for, and potentially locate, the preferred network faster than when the user device waits to search for the preferred network after becoming idle. While active, the user device may search for the preferred network for a relatively short duration, in order to limit the amount of time that data flow transmission is interrupted when searching for the preferred network. The user device may search for the preferred network based on a list of search parameters. The list of search parameters may be prioritized differently based on whether the user device is active or idle, and may be based on a quantity of times that the user device has searched for the preferred network.

20 Claims, 11 Drawing Sheets

(56) References Cited

U.S. PATENT DOCUMENTS

2013/0210428 A1* 8/2013 Manna .............. H04W 52/0245
455/434
2018/0132155 A1* 5/2018 Pao ....................... H04W 36/24

* cited by examiner

SCANNING FOR A PREFERRED NETWORK DURING AN ACTIVE CONNECTION TO ANOTHER NETWORK

CROSS-REFERENCE TO RELATED APPLICATION

This application claims priority to provisional U.S. Patent Application No. 62/111,504, titled "SCANNING FOR A PREFERRED NETWORK DURING AN ACTIVE CONNECTION TO ANOTHER NETWORK," filed on Feb. 3, 2015, the disclosure of which is incorporated herein by reference in its entirety.

BACKGROUND

A user device (such as a cellular phone) may search for a cellular network that provides the best available service. For example, the user device may search for a preferred network, such as a Long-Term Evolution ("LTE") network and/or a similar type of network. If the preferred network is found, the user device may attach to the preferred network (e.g., via a base station associated with the preferred network). If the preferred network is not found (e.g., if the user device is located outside of a service area covered by the preferred network), the user device may search for, and attach to, an alternate network (e.g., a Code Division Multiple Access 2000 ("1×") network, a second generation ("2G") network, a third generation ("3G") network, etc.), in order to maintain cellular service when the preferred network is unavailable. While service interruption may be avoided by way of attaching to the alternate network, service quality may suffer when the user device is attached to the alternate network in relation to the preferred network.

DETAILED DESCRIPTION OF THE PREFERRED EMBODIMENTS

Figure 1A:
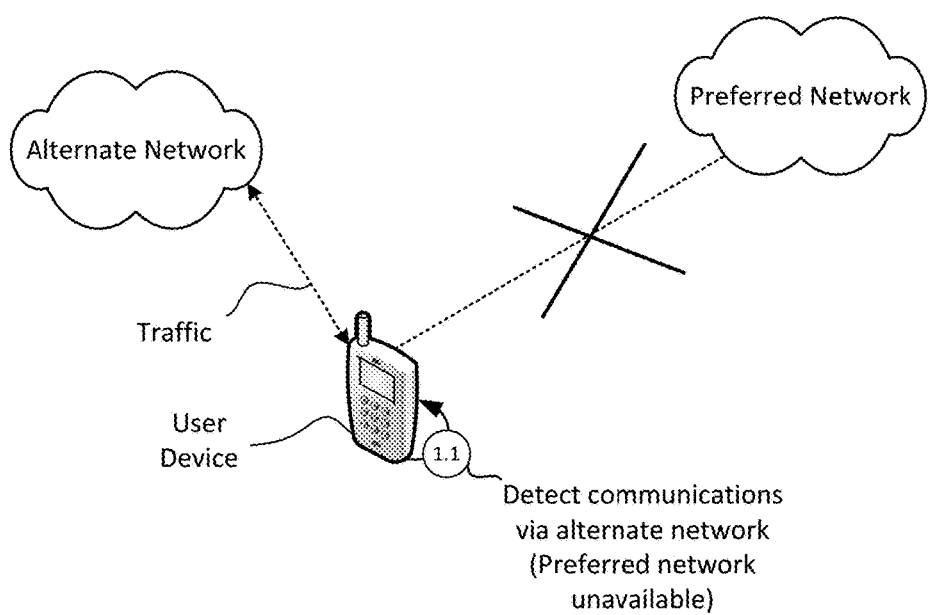
FIGS. 1A-1D illustrate an example overview of an implementation described herein.

The following detailed description refers to the accompanying drawings. The same reference numbers in different drawings may identify the same or similar elements.

In order to avoid service interruption, a user device may attach to an alternate network (e.g., a Code Division Multiple Access 2000 1× network (hereinafter referred to as a "CDMA2000 1× network," or simply as a "1× network"), a second generation ("2G") network, a third generation ("3G") network, etc.) when a preferred network (e.g., a Long-Term Evolution ("LTE") or similar network) is unavailable. Such a situation may occur when, for example, the user device moves to a geographic location in which the preferred network is unavailable, but where the alternate network is available.

When a user device attaches to an alternate network (e.g., a network other than a "preferred" network), the user device may remain attached to the alternate network for longer than necessary, even if the preferred network later becomes available (e.g., when the user device later moves to a region in which the preferred network is available). For example, the user device may not attempt to search for the preferred network while the user device is actively communicating (e.g., actively transmitting and/or receiving data) via the alternate network. That is, if the preferred network is available, but the user device is actively communicating via the alternate network, the user device will typically continue to communicate via the alternate network, and will not search for the preferred network.

Also, even when the user device is idle (e.g., not actively communicating via the alternate network), the user device may only search for the preferred network after having remained idle for a relatively long time. For example, the user device may search for the preferred network after the expiration of a network reselection timer (e.g., a timer that begins a countdown to zero when the user device becomes idle).

The network reselection timer may be relatively long, which may be beneficial in preventing the user device from "ping-ponging" between networks (e.g., repeatedly reestablishing connections between the alternate and preferred networks within a short period of time when the user device is near a border of the preferred network). However, the network reselection timer can also further delay the user device from searching for the preferred network for longer than necessary. For example, if the user device becomes idle while attached to the alternate network, but then becomes active before the timer expires, the user device may not attempt to search for the preferred network. Once the user device again becomes idle, the timer may restart, and the user device may not to search for the preferred network until the user device remains idle until the timer expires. This cycle may potentially continue for a relatively long period of time, even when the user device is no longer at risk for "ping-ponging" between networks. Further, when the user device eventually does search for the preferred network, and when the preferred network is not found, the network reselection timer may restart, and the user device may not again search for the preferred network until the timer again expires.

Systems and/or methods, as described herein, may cause a user device to search for the preferred network even if the user device is active (e.g., sending and/or receiving data) when attached to an alternate network. Also, when idle (e.g., not sending and/or receiving data), the user device may search for the preferred network in relatively shorter intervals than those intervals implemented by a conventional network selection timer (while still permitting the network selection timer to initially operate, to prevent the user device from "ping-ponging" between networks). Further, the user device may prioritize search parameters used to search for the preferred network, which may increase the chances of finding the preferred network in a shorter amount of time.

FIGS. 1A-1D illustrate an example overview of an implementation described herein. As shown in FIG. 1A, a user device may communicate via an alternate network when a preferred network is unavailable (e.g., if the user device travels away from a geographic region in which the preferred network is available and to a geographic region in which the alternate network is available). The user device may detect that the user device is communicating via the alternate network when a connection to the preferred network is unavailable (arrow 1.1). As discussed above, in conventional systems, the user device typically continues communications via the alternate network, and may not search for the preferred network (and, in turn, may not restore its connection to the preferred network) until the user device has become idle, and has remained idle until a network reselection time expires.

Figure 1B:
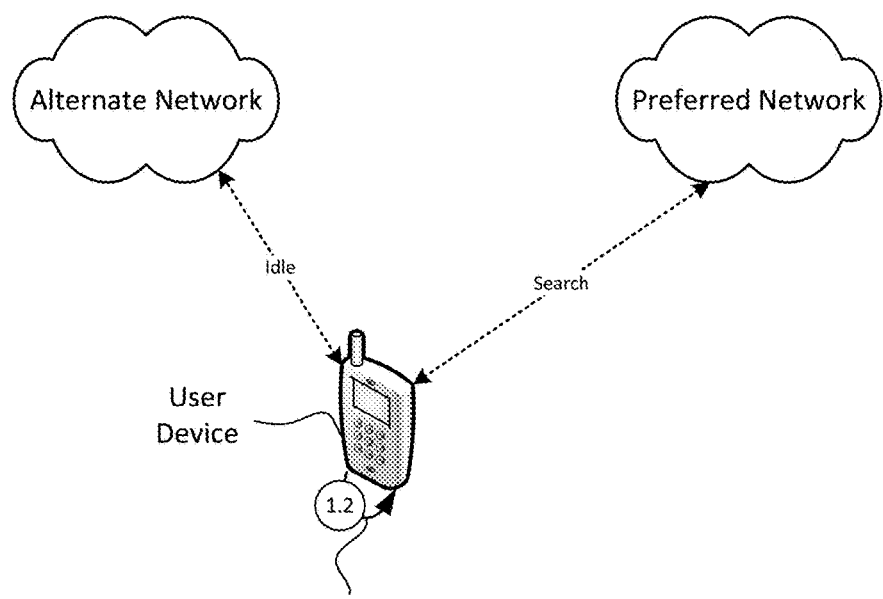

Referring to FIG. 1B, in accordance with some implementations, the user device, when connected to the alternate network and when idle, may perform a prioritized search for the preferred network based on a list of prioritized search parameters (arrow 1.2). For example, the user device may search for the preferred network by first searching for a last known cell (e.g., the cell via which the user device last communicated with the preferred network). In some implementations, the user device may search for the last known cell based on a Physical Cell Identity ("PCI") of the cell. If the last known cell is not found, the user device may then search for cells associated with the same frequency band as the last known cell. If no cells are found at the same frequency band, the user device may then scan frequency bands that neighbor (e.g., one or more bands that are higher than, and/or one or more bands that are lower than) the frequency band of the last known network. If the preferred network is again not found, the user device may scan frequency bands in order of priority defined in a preconfigured table stored by the user device. In some implementations, the user device may search for the preferred network using search parameters in a different order than described above.

When the user device is idle, the user device may perform a "complete" search by searching for the preferred network based on a full list of search parameters. As described below, the user device may perform a "shortened" search when the user device is idle, by only searching for the preferred network for a limited amount of time, even if the user device has not completed searching for the preferred network based on the full list of search parameters. In some implementations, the list of search parameters may be determined based on a quantity of times that the user device has searched for the preferred network.

In some implementations, the user device may periodically repeat the "complete" search at particular intervals (e.g., "idle search intervals"). The idle search intervals may be shorter intervals than those implemented by a conventional network reselection timer. For example, if the preferred network is not found after searching for the preferred network, the user device may again search for the preferred network after a few seconds have passed, rather than waiting to search for the preferred network when the conventional network reselection timer expires.

Figure 1C:
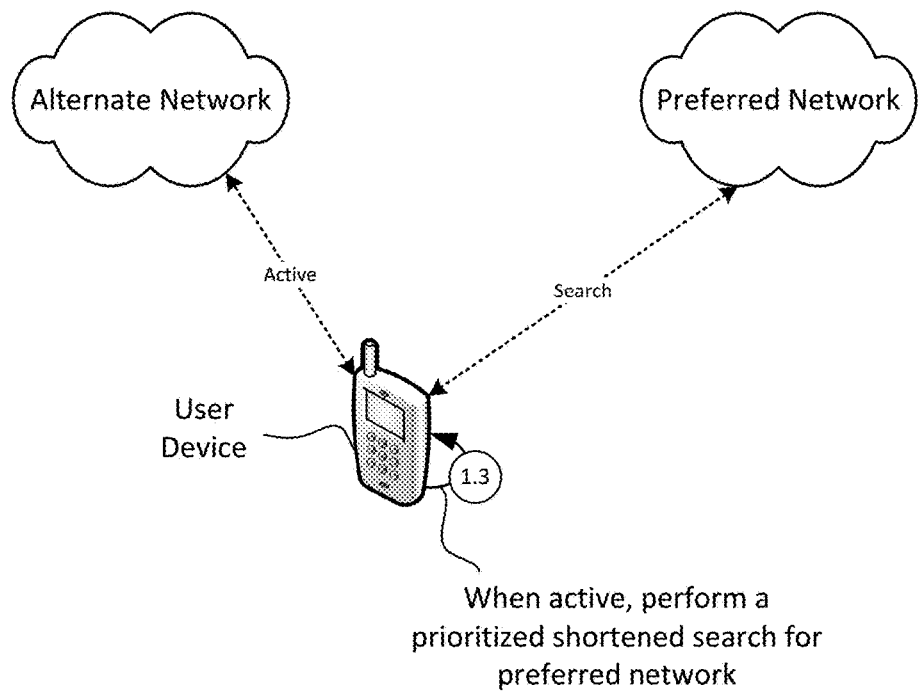

Referring to FIG. 1C, the user device may search for the preferred network when the user device is connected to the alternate network and is active (arrow 1.3). For example, the user device may perform a "shortened" prioritized search, in which the user device may search for the preferred network for only a limited amount of time. The user device may search for the preferred network for a limited amount of time to limit the amount of time that data flow transmission is interrupted when searching for the preferred network, hence limiting adverse impacts on user experience. The user device may search for the preferred network based on the prioritized parameters list as described above. In some implementations, the user device, when active, may search for the preferred network based on a different list of parameters than when the user device searches for the preferred network when idle. Additionally, or alternatively, the user device, when active, may search for the preferred network based on a different parameter priority than when the user device searches for the preferred network when idle.

If the preferred network is not found during the limited amount of time and before the search has completed (e.g., before the user device has searched based on all of the parameters in the prioritized list), the user device may resume the shortened search after a particular period of time has passed. For example, the user device may resume the search from the point on the prioritized parameters list where the previous search was stopped.

If the preferred network is not initially found while the user device is active, the user device may continue to periodically search for the preferred network at particular intervals (e.g., "active search intervals"). The active search intervals may be longer than the idle search intervals (e.g., to limit the amount of time that data flow transmission is interrupted and hence, limit adverse impacts on user experience).

As described in greater detail below, the idle search intervals and/or the active search intervals may increase in a "telescoping" manner. For example, these intervals may iteratively increase when the preferred network has not been found after the user device has searched for the preferred network a particular number of times. Since battery consumption when searching for the preferred network may be substantially higher than when the user device is not searching for the preferred network, increasing the search intervals may conserve battery life by reducing the number of times that the user device searches for the preferred network.

Figure 1D:
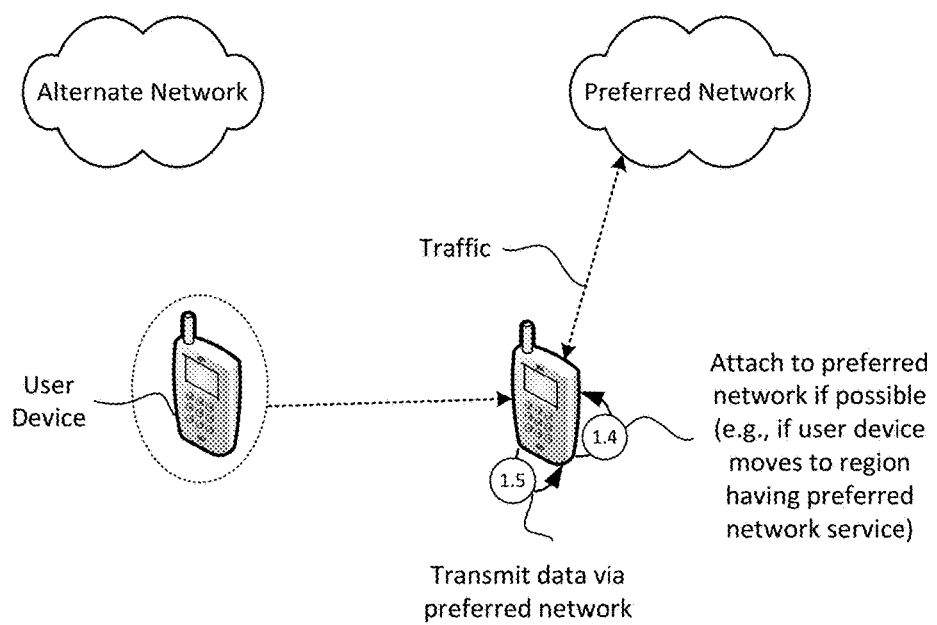

Referring to FIG. 1D, the user device may attach to the preferred network if a signal, associated with the preferred network is found (arrow 1.4). For example, the user device may attach to the preferred network if the user device has moved to a location in which a signal for the preferred network is available. The user device may then transmit traffic via the preferred network (arrow 1.5).

Figure 2:
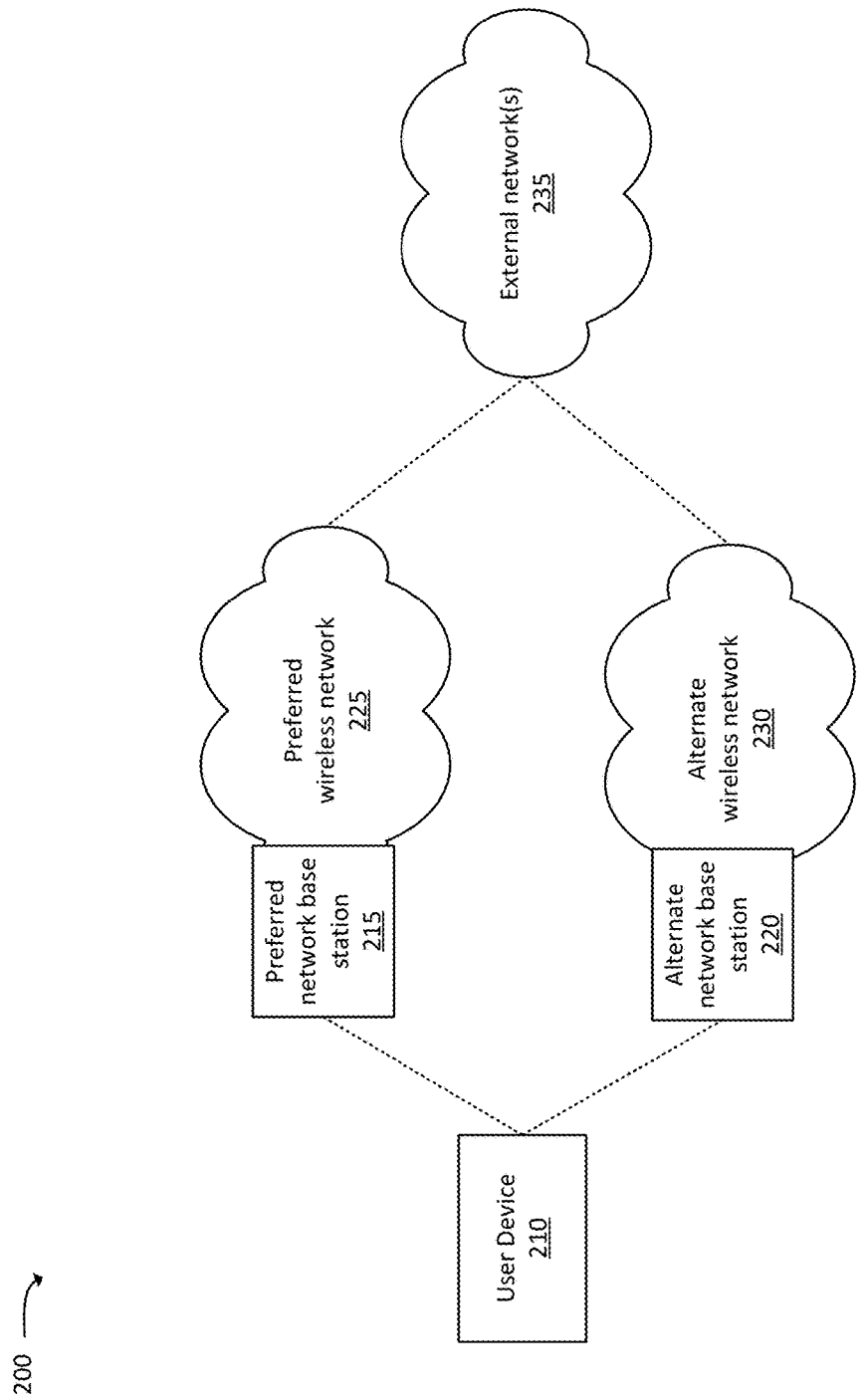
FIG. 2 illustrates an example environment in which systems and/or methods, described herein, may be implemented.

FIG. 2 is a diagram of an example environment 200 in which systems and/or methods described herein may be implemented. As shown in FIG. 2, environment 200 may include user device 210, preferred network base station 215, alternate network base station 220, preferred wireless network 225, alternate wireless network 230, and external network(s) 235.

User device 210 may include any computation or communication device, such as a wireless mobile communication device that is capable of communicating with preferred wireless network 225 (e.g., via base station 215), alternate wireless network 230 (e.g., via alternate network base station 220), and/or external network(s) 235. For example, user device 210 may include a radiotelephone, a personal communications system ("PCS") terminal (e.g., that may combine a cellular radiotelephone with data processing and data communications capabilities), a personal digital assistant ("PDA") (e.g., that can include a radiotelephone, a pager, Internet/intranet access, etc.), a smart phone, a laptop computer, a tablet computer, a camera, a personal gaming system, or another type of computation or communication device. User device 210 may send data to and/or receive data from external network(s) 235 (e.g., via preferred wireless network 225 and/or alternate wireless network 230).

In some implementations, user device 210 may determine that user device 210 is connected to alternate wireless network 230. User device 210 may search for preferred wireless network 225 whether user device 210 is active or idle while connected to alternate wireless network 230. As described in further detail below, the manner in which user device 210 searches for preferred wireless network 225 may be based on whether user device 210 is idle or active. Additional examples of functionality of user device 210 are described below with respect to FIG. 3.

Preferred network base station 215 may include one or more network devices that receive, process, and/or transmit traffic, such as audio, video, text, and/or other data, destined for and/or received from user device 210. In an example implementation, preferred network base station 215 may be an eNodeB ("eNB") device and may be part of preferred wireless network 225, in implementations where preferred wireless network 225 is, or includes, an LTE radio access network ("RAN"). Preferred network base station 215 may receive traffic from and/or send traffic to network(s) 235 via preferred wireless network 225 (which may include a serving gateway, a packet data network gateway, a mobility management entity, and/or one or more other devices), and may send traffic to and/or receive traffic from user device 210 via an air interface (e.g., via preferred network base station 215).

Alternate network base station 220 may include one or more network devices that receive, process, and/or transmit traffic, such as audio, video, text, and/or other data, destined for and/or received from user device 210. In an example implementation, alternate network base station 215 may include a Base Transceiver Station ("BTS"), a base station subsystem ("BSS"), and/or a base station controller ("BSC"). Alternate network base station 220 may receive traffic from and/or send traffic to network(s) 235 via alternate wireless network 230 (which may include a mobile switching center, a home location register, a visitor location register, and/or one or more other devices), and may send traffic to and/or receive traffic from user device 210 via an air interface (e.g., via alternate network base station 220).

In some implementations, alternate wireless network 230 may be a network associated with a different Radio Access Technology (RAT) as preferred wireless network 225. For example, alternate wireless network 230 may be a 1× network, a 2G network, a 3G network, and/or other type of network. In some implementations, alternate wireless network 230 may be a network associated the same RAT as preferred wireless network 225, but may be associated with a different carrier of preferred wireless network 225 (e.g., a roaming carrier).

External network(s) 235 may include one or more wired and/or wireless networks. For example, external network(s) 235 may include one or more packet data networks ("PDNs"), such as the Internet, a local area network ("LAN"), a wide area network ("WAN"), a metropolitan network ("MAN") an ad hoc network, a managed Internet Protocol ("IP") network, a virtual private network ("VPN"), an intranet, a fiber optic-based network, and/or a combination of these or other types of networks. In some implementations, external network(s) may include a circuit-switched network, such as the Public Switched Telephone Network ("PSTN"). Additionally, or alternatively, external network(s) 235 may include one or more cellular network (e.g., 1× network, a 2G network, a 3G network, a fourth generation ("4G") network, a fifth generation ("5G") network, an LTE network, a global system for mobile ("GSM") network, a CDMA network, an evolution-data optimized ("EVDO") network, or the like), a public land mobile network ("PLMN"), and/or another network.

The quantity of devices and/or networks in environment 200 is not limited to what is shown in FIG. 2. In practice, environment 200 may include additional devices and/or networks; fewer devices and/or networks; different devices and/or networks; or differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
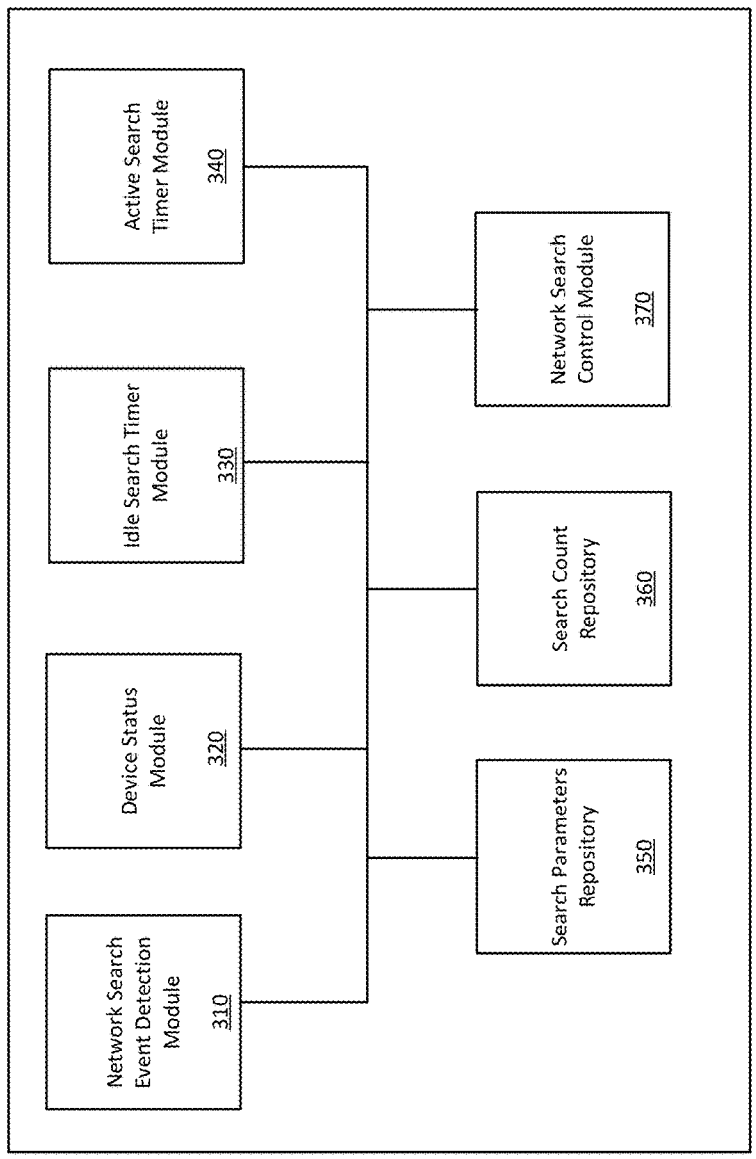
FIG. 3 illustrates example functional components of a user device, in accordance with some implementations described herein.

FIG. 3 illustrates example functional components of user device 210. As shown in FIG. 3, user device 210 may include network search event detection module 310, device status module 320, idle search timer module 330, active search timer module 340, search parameters repository 350, search count repository 360, and network search control module 370.

Network search event detection module 310 may determine that network search control module 370 should search for a preferred network (e.g., preferred wireless network 225). Network search event detection module 310 may determine that network search control module 370 should search for the preferred network when user device 210 is connected to an alternate network (e.g., alternate wireless network 230). In some implementations, network search event detection module 310 may determine that network search control module 370 should search for the preferred network when a network reselection timer has expired. For example, when user device 210 initially connects to the alternate network, network search event detection module 310 may run the network reselection timer to prevent user device 210 from "ping-ponging" between the preferred and alternate networks. In some implementations, the amount of time on network reselection timer can be configurable by a network administrator associated with the preferred network, and may be pushed to user device 210. In some implementations, network search event detection module 310 may not run the network reselection timer, and may simply determine that user device 210 should search for the preferred network when user device 210 connects to the alternate network.

Device status module 320 may determine a status of user device 210 when user device 210 is connected to the alternate network. For example, device status module 320 may determine that user device 210 is active (e.g., when user device 210 is actively transmitting traffic via the alternate network) or idle (e.g., when user device 210 is not actively transmitting traffic via the alternate network). In some implementations, device status module 320 may determine that user device 210 is idle when user device 210 is transmitting less than a threshold amount of traffic via the alternate network, and/or only traffic with a certain quality of service ("QoS") marking (e.g., a QoS class identifier ("QCI")).

Idle search timer module 330 may include a timer (e.g., an "idle search timer") that may be started when user device 210 is connected to the alternate network, is idle, and when network search event detection module 310 indicates that network search control module 370 should search for the preferred network. The idle search timer may include a countdown value, and when the idle search timer is started, the timer may countdown backwards from the countdown value. Additionally, or alternatively, the idle search timer may count time forward up to a set value. Upon expiration of the timer (e.g., when the timer either reads a threshold amount of time after counting forward, or when the timer has counted down to zero), network search control module 370 may search for the preferred network. The idle search timer may be reset when the preferred network is not found, and when user device 210 is still idle.

Active search timer module 340 may include a timer (e.g., an "active search timer") that may be started when user device 210 is connected to the alternate network, is active, and when network search event detection module 310 indicates that network search control module 370 should search for the preferred network. Similar to the idle search timer, the active search timer may include a countdown value, and when the active search timer is started, the timer may countdown backwards from the countdown value. Additionally, or alternatively, the active search timer may count time forward up to a set value. Upon expiration of the active search timer, network search control module 370 may search for the preferred network. Active search timer module 340 may also include an "active search duration timer" that may be started when network search control module 370 begins to search for the preferred network while user device 210 is active. Network search control module 370 may discontinue searching for the preferred network when the active search duration timer expires in order to limit the amount of time that data flow transmission is interrupted when searching for the preferred network while user device 210 is active. The active search timer may be reset when the preferred network is not found, and when user device 210 is still active.

As described in greater detail below, the amount of time from which the idle search timer and/or the active search timer counts down may dynamically adjust based on the number of times network search control module 370 has searched for the preferred network, but has not found the preferred network. For example, after network search control module 370 has searched for the preferred network a threshold number of times (but has not found the preferred network), additional time may be added so that the intervals between when network search control module 370 searches for the network increases.

Search parameters repository 350 may store information identifying search parameters based on which network search control module 370 should search for a preferred network. Example search parameters may include:
  "Last known cell": network search control module 370 may search for the last cell (e.g., based on a PCI of the cell) via which user device 210 communicated with the preferred network;
  "Same band as last known cell": network search control module 370 may scan a particular frequency band associated with the last known cell;
  "Neighboring bands": network search control module 370 may scan those frequency bands that neighbor the frequency band associated with the last known cell (e.g., as identified in System Information Block 5 ("SIB5"));
  "Priority band table": network search control module 370 may scan frequency bands in order of priority as defined in a preconfigured table stored by the user device. This preconfigured table may be pushed to user device 210 by a preferred network.

Search count repository 360 may store information identifying a quantity of times that network search control module 370 has searched for the preferred network. For example, each time network search control module 370 searches for a preferred network and the preferred network is not found, network search control module 370 may add to a search count stored by search count repository 360. When network search control module 370 finds the preferred network, the search count may be cleared. In some implementations, search count repository 360 may store an "idle search count" (e.g., a quantity of times the preferred network has been searched while user device 210 is idle). Additionally, or alternatively, search count repository 360 may store an "active search count" (e.g., a quantity of times the preferred network has been searched while user device 210 is active on the alternate network). In some implementations, search count repository 360 may store information identifying the last parameter based on which user device 210 searched for the preferred network. As described in greater detail below, the search counts and/or the last search parameter may be used to determine a search priority identifying a sequence of search parameters based on which to search for the preferred network.

Network search control module 370 may control the manner in which user device 210 searches for the preferred network based on information received from network search event detection module 310, device status module 320, search parameters repository 350, and/or search count repository 360. When network search event detection module 310 indicates that user device 210 should search for the preferred network, and when device status module 320 indicates that user device 210 is idle, network search control module 370 may direct idle search timer module 330 to start the idle search timer. Similarly, network search control module 370 may direct idle search timer module 330 to being the active search timer.

In some implementations, while one of the timers is running, network search control module 370 may determine a search priority (e.g., a prioritized list identifying a sequence of search parameters based on which to search for the preferred network). In some implementations, the search priority may be based on the search count, last used search parameters, and/or other information. Additional details and examples describing the determination of the search priority are described in greater detail below with respect to FIGS. 4 and 5.

When either the idle search timer or the active search timer expires, network search control module 370 may search for the preferred network based on the determined search priority. For example, when the idle search timer expires, network search control module 370 may perform a "complete search," in which network search control module 370 searches for the preferred network using the complete prioritized list. If the preferred network has not been found, and if user device 210 is still idle, the idle search timer may be reset, and upon expiration, network search control module 370 may again perform a complete search.

When the active search timer expires, network search control module 370 may perform a "shortened search" in which network search control module 370 searches for the preferred network until the active search duration timer has expired (e.g., even if network search control module 370 has not had time to search for the preferred network based on all of the parameters identified by the prioritized list). If the preferred network has not been found, and if user device 210 is still active, the active search timer may be reset, and network search control module 370 may again determine a search priority with consideration to the last search parameter based on which a search for the preferred network was performed. The parameters in the search priority may first include those parameters that follow the last search parameter. When the active search time expires, network search control module 370 may, in effect, resume searching for the preferred network from the point on the prioritized list where the previous search was stopped (e.g., by the active search duration timer).

Figure 4:
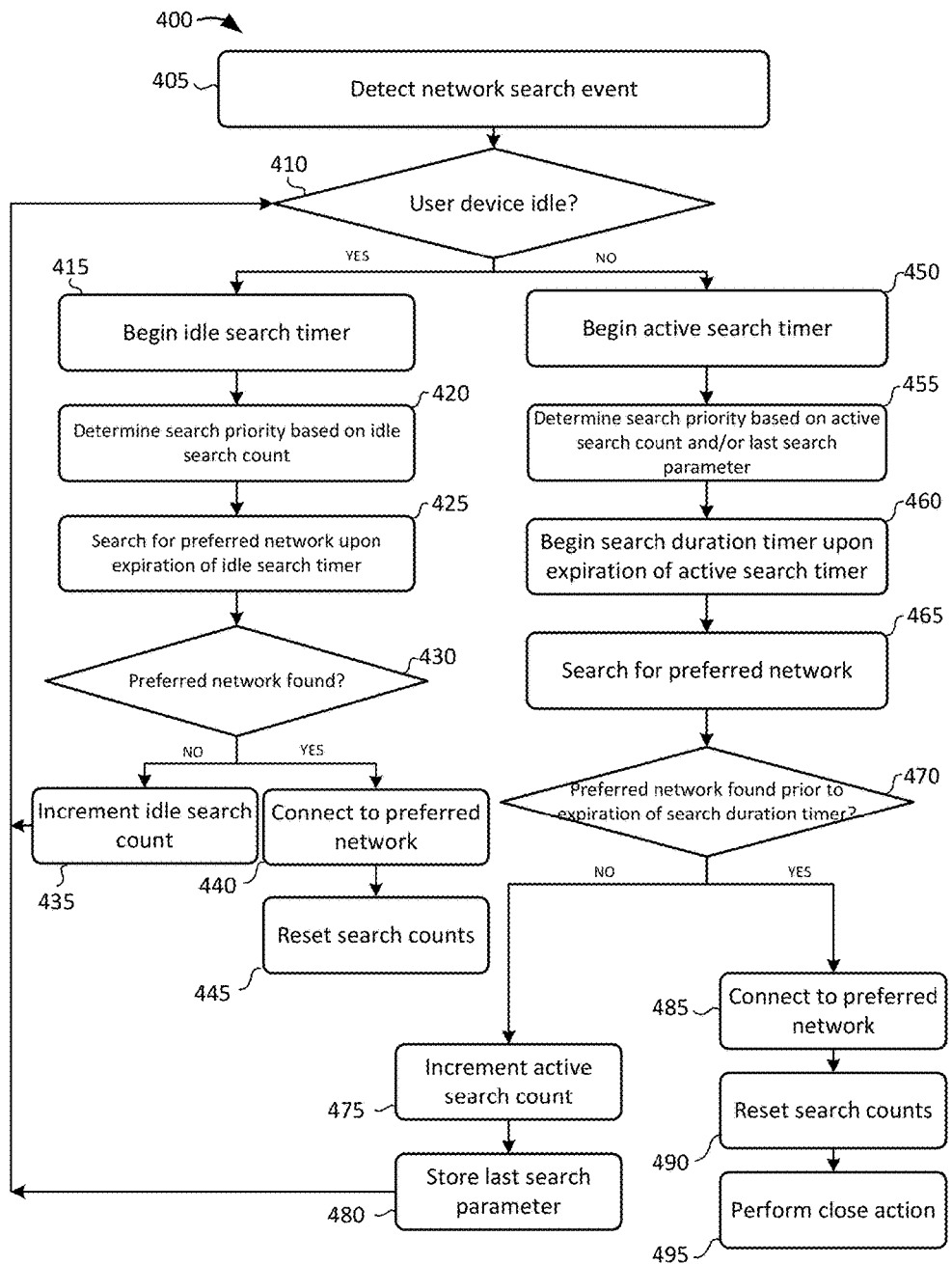
FIG. 4 illustrates a flowchart of an example process for searching for a preferred network while connected to an alternate network.

FIG. 4 illustrates a flowchart of an example process 400 for searching for a preferred network while connected to an alternate network. In some implementations, process 400 may be performed by user device 210. In some implementations, some or all of blocks of process 400 may be performed by one or more other components or devices.

As shown in FIG. 4, process 400 may include detecting a network search event (block 405). For example, as described above with respect to network search event detection module 310, user device 210 may detect a network search event when a network reselection timer has expired. For example, when user device 210 initially connects to the alternate network, user device 210 may run the network reselection timer to prevent user device 210 from "ping-ponging" between the preferred and alternate networks. Alternatively, user device 210 may detect the network search event simply when user device 210 connects to the alternate network. Alternatively, user device 210 may detect the network search event when a user of user device 210 manually selects a command on user device 210 to search for the preferred network.

Process 400 may further include determining whether the user device is idle (block 410). For example, as described above with respect to device status module 320, user device 210 may determine whether it is idle or active. In some implementations, user device 210 may determine that user device 210 is idle when user device 210 is transmitting less than a threshold amount of traffic via the alternate network, and/or when user device 210 is transmitting only traffic associated with a certain QCI.

If, for example, the user device is idle (block 410—YES), process 400 may include beginning an idle search timer (block 415). For example, as discussed above with respect to idle search timer module 330, user device 210 may begin the idle search timer. In some implementations, the duration of time on the idle search timer may be based on a search count (based on information stored by search count repository 360). Additional details regarding modifying the duration of time on the idle search timer are described below with respect to FIG. 6.

Process 400 may also include determining a search priority based on the idle search count (block 420). For example, as described with respect to network search control module 370, user device 210 may determine the search priority based on the idle search count (e.g., based on information stored by search count repository 360). In some implementations, user device 210 may generate a prioritized list identifying a priority for search parameters based on which to search for the preferred network. In some implementations, the search priority may be based on the idle search count. For example, user device 210 may store a lookup table identifying the search priority based on the idle search count. The idle search count may initially be zero when the user device initially connects to the alternate network after disconnecting from the preferred network.

As an example, user device 210 may store a lookup table identifying that when the idle search count is within the range of 0 to 4, the search priority should be, in descending order: Parameter A, Parameter B, Parameter C, and Parameter D. As another example, user device 210 may store a lookup table identifying that when the idle search count is within the range of 5 to 9, the search priority should be, in descending order: Parameter B, Parameter A, Parameter D, and Parameter C.

Process 400 may further include searching for the preferred network upon expiration of the idle search timer (block 425). For example, as described with respect to network search control module 370, user device 210 may search for the preferred network upon expiration of the idle search timer. User device 210 may search for the preferred network in accordance with the determined search priority (e.g., prioritize list of search parameters). User device 210 may perform a "complete" search by searching for the preferred network based on all of the parameters in the prioritized list. That is, user device 210 may discontinue searching for the preferred network after searching based on all of the parameters in the prioritized list As an example, user device 210 may search for the preferred network by first searching for last known cell (e.g., based on the PCI of the last known cell). If the last known cell is not found, user device 210 may then search for cells associated with the same frequency band as the last known network. If no cells are found, user device 210 may then scan frequency bands that neighbor those of the last known cell. If the preferred network is again not found, user device 210 may scan frequency bands in order of priority defined in a preconfigured table stored by the user device. In some implementations, user device 210 may search for the preferred network using search parameters in a different order than described above.

Process 400 may further include determining whether the preferred network has been found (block 430). If, for example, the preferred network has not been found (block 430-NO), process 400 may include incrementing the idle search count (block 435). For example, user device 210 may add the number 1 to the idle search count stored by search count repository 360 (e.g., to indicate that a search for the preferred network has been completed). Process 400 may then return to block 410, where user device 210 may again begin an idle search timer (assuming user device 210 is still idle). User device 210 may then determine a search priority based on the idle search count, and search for the preferred network upon expiration of the idle search timer.

If, on the other hand, the preferred network has been found (block 430—YES), process 400 may include connecting to the preferred network (440). For example, user device 210 may connect to the preferred network.

Process 400 may also include resetting the search count (block 445). For example, user device 210 may reset both the idle and active search counts stored by search count repository 360. The search counts may be reset so that when user device 210 later disconnects from the preferred network and connects to the alternate network, user device 210 may determine the search priority from a search count that has been reset.

If, on the other hand, user device 210 is active (block 410-NO), process 400 may include beginning an active search timer (block 450). For example, as described above with respect to active search timer module 340 in FIG. 3, user device 210 may begin the active search timer. In some implementations, the duration of time on the active search timer may be based on an active search count (based on information stored by search count repository 360). The active search count may initially be zero when user device 210 initially disconnects from the preferred network and connects to the alternate network. Additional details regarding increasing the duration of time on the active search timer are described below with respect to FIG. 6.

Process 400 may also include determining a search priority based on the active search count and/or last search parameter (block 455). For example, as described above with respect to network search control module 370, user device 210 may determine the search priority based on the active search count and/or the last search parameter (e.g., the last search parameter based on which user device 210 previously searched for the preferred network while user device 210 was active).

In some implementations, the search priority may include those parameters that follow the last search parameter on a prioritized list. The prioritized list may be based on the active search count (or may simply be a default list regardless of the active search count). For example, assume that the active search count is 1. Further, assume that user device 210 stores a lookup table identifying a prioritized list when the active search count is within the range of 0 and 4, and the prioritized list identifies search parameters in the following sequence: Parameter A, Parameter B, Parameter C, and Parameter D. Further, assume that the last search parameter based on which user device 210 searched for the preferred network while active was Parameter B. Given this assumption, user device 210 may determine that the search priority, in descending order, is Parameter C, Parameter D, Parameter A, and Parameter B. That is, user device 210 may cycle back to the beginning of a prioritized list after reaching the end of the prioritized list. Alternatively, user device 210 may determine that it had previously searched based on Parameter A and Parameter B, and that the search priority may start with Parameter C and Parameter D.

Process 400 may also include beginning the search duration timer upon expiration of the active search timer (block 460). For example, user device 210 may begin the search duration timer when the active search timer expires.

Process 400 may further include searching for the preferred network (block 465). For example, user device 210 may perform a "shortened" search, whereby user device 210 searches for the preferred network (e.g., concurrently with the start of the search duration timer), and discontinues searching for the preferred network when the search duration timer expires. User device 210 may perform the "shortened" search to limit the impact on user experience when searching for the preferred network while user device 210 is active (which may correspond to when a user of user device 210 is actively using user device 210).

User device 210 may search for the preferred network in accordance with the determined search priority. Since the determined search priority may begin with a search parameter following the last used search parameter, user device 210 may, in effect, "resume" searching for the preferred network from the point where the previous search was stopped (e.g., by the expiration of the search duration timer).

Process 400 may also include determining whether the preferred network has been found prior to the expiration of the search duration timer (block 470). If, for example, user device 210 does not find the preferred network prior to the expiration of the search duration timer (block 470-NO), process 400 may include incrementing the active search count (block 475). For example, user device 210 may add the number 1 to the idle search count stored by search count repository 360 (e.g., to indicate that a search for the preferred network has been completed).

In some implementations, user device 210 may not increment the active search count unless user device 210 has completed searching for the preferred network based on all the search parameters on a prioritized list. For example, assume that the prioritized list includes, in descending order of priority: Parameter A, Parameter B, Parameter C, and Parameter D. Further, assume that user device 210 has searched based on Parameter A and Parameter B, but had not searched based on Parameter C and Parameter D (e.g., since the search duration timer expired before user device 210 was able to search based on Parameter C and Parameter D). Given these assumptions, user device 210 may not increment the search count. However, the next time user device 210 searches for the preferred network in active mode, user device 210 may search based on Parameter C and Parameter D (thus exhausting the prioritized list of parameters). In this situation, user device 210 may increment the active search count. Alternatively, user device 210 may increment the active search count regardless of whether user device 210 has searched based on all the parameters in the prioritized list.

Process 400 may also include storing the last search parameter (block 480). For example, user device 210 may store the last search parameter based on which user device 210 searched for the preferred network so that when user device 210 subsequently searches for the preferred network while active, user device 210 can resume searching for the preferred network from the point where the previous search was stopped (e.g., by the expiration of active search duration timer). In some implementations, the last search parameter may be stored by search count repository 360. Process 400 may then return to block 410 where user device 210 may determine whether user device 210 is idle or active, perform a "complete search" when user device 210 is idle, and perform a "shortened search" when user device 210 is active.

If, on the other hand, user device 210 does find the preferred network prior to the expiration of the search duration timer (block 470—YES), process 400 may include connecting to the preferred network (block 485). For example, user device 210 may connect to the preferred network.

Process 400 may also include resetting the search count (block 490). For example, user device 210 may reset both the idle and active search counts stored by search count repository 360. The search counts may be reset so that when user device 210 later disconnects from the preferred network and connects to the alternate network, user device 210 may determine the search priority from a search count that has been reset.

Process 400 may further include performing a close action (block 495). For example, user device 210 may perform one or more close actions based on connecting to the preferred network. In some implementations, the close action(s) may be based on a type of alternate network that user device 210 was connected to immediately prior to connecting to the preferred network. The close action(s) may be performed to properly close, release, or otherwise terminate the connection between user device 210 and the alternate network. For example, if user device 210 was connected to a 1× network, user device 210 may output a release instruction to a base station or other device associated with the 1× network. User device 210 may output other types of messages and/or information in order to properly close or terminate the connection between user device 210 and the alternate network.

In some implementations, user device 210 may receive paging messages from one or more devices from the alternate network. User device 210 may discard these messages, so that user device 210 does not reconnect to the alternate network after having connected to the preferred network.

Figure 5:
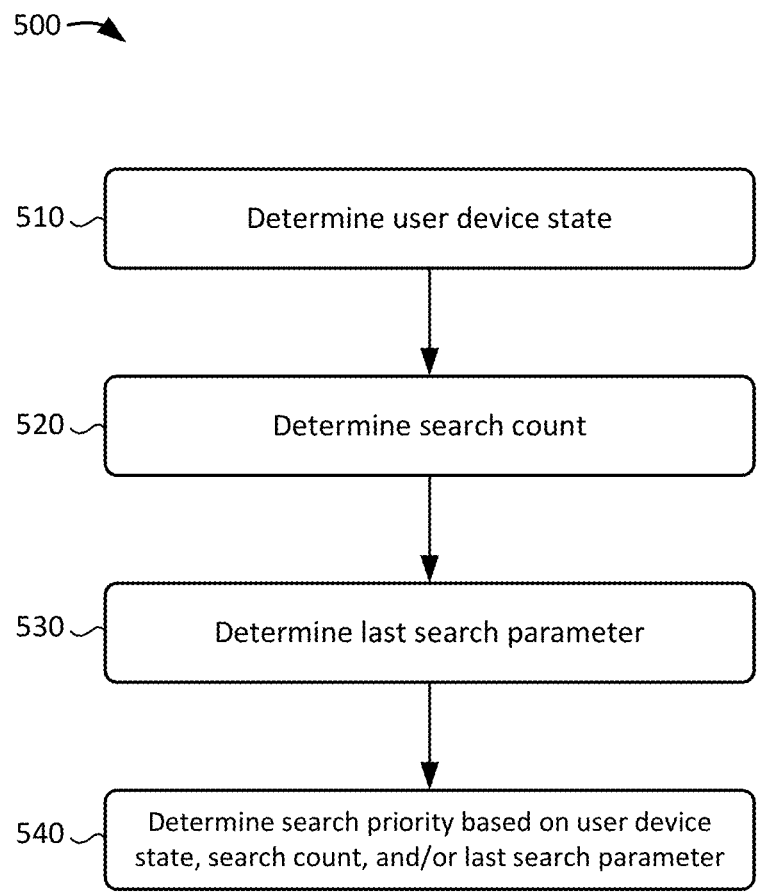
FIG. 5 illustrates a flowchart of an example process for determining a search priority for search parameters based on which a user device should search for a preferred network.

FIG. 5 illustrates a flowchart of an example process 500 for determining a search priority for search parameters based on which a user device should search for a preferred network. In some implementations, process 500 may be performed by user device 210. In some implementations, some or all of blocks of process 500 may be performed by one or more other components or devices. In some implementations, process 500 may correspond to blocks 420 and/or 455 of process 400.

As shown in FIG. 5, process 500 may include determining the state of a user device (block 510). For example, user device 210 may determine whether it is in an idle state or an active state (e.g., as described above with respect to block 410 in FIG. 4).

Process 500 may further include determining a search count (block 520). For example, user device 210 may determine a search count based on information stored by search count repository 360. User device 210 may determine either an "idle search count" (e.g., when user device 210 is in an idle state), or an "active search count" (e.g., when user device 210 is an active state).

Process 500 may also include determining a last search parameter (530). For example, user device 210 may determine the last search parameter based on information stored by search count repository 360. In some implementations, process 500 may be omitted when user device 210 is idle.

Process 500 may further include determining a search priority based on the user device state, search count, and/or last search parameter (block 540). For example, user device 210 may determine the search priority based on the state of user device 210, search count, and/or last search parameter. In some implementations, user device 210 may determine the last search parameter based on a lookup table identifying the search priority based on the idle search count or the active search count. If user device 210 is active, user device 210 may determine the search priority further based on the last search parameter so that user device 210 may search for the preferred network based on search parameters after those identified in a prioritized list of search parameters (which may be based on the active search count). The search priority may be a priority of the parameters based on which user device 210 should search for the preferred network (e.g., a priority of the "last known cell" parameter, "same band as last known cell" parameter, "neighboring bands" parameter, "priority band table" parameter, etc.).

Figure 6:
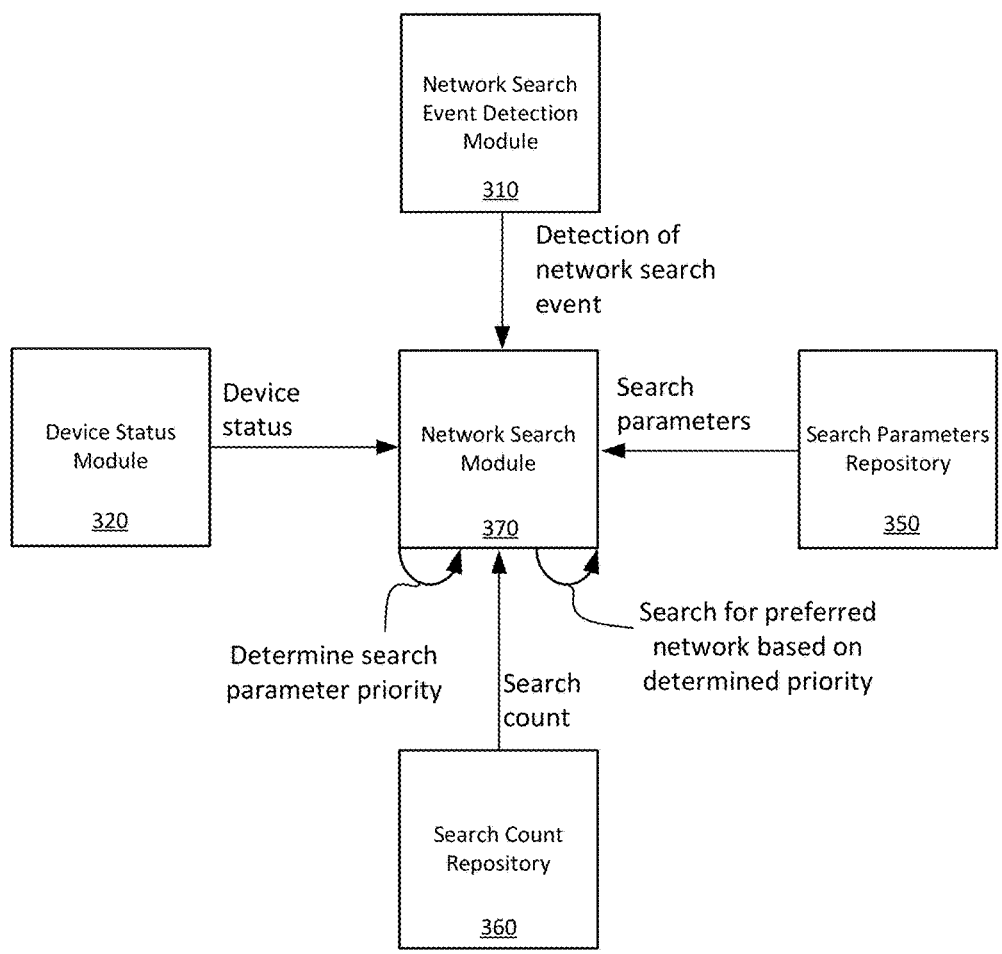
FIG. 6 illustrates an example implementation for determining a search priority for search parameters based on which a user device should search for a preferred network.

FIG. 6 illustrates an example implementation for determining a search priority for search parameters based on which a user device should search for a preferred network, searching for the preferred network based on the search priority. As shown in FIG. 6, network search control module 370 may receive an indication that network search event detection module 310 has detected a network search event. Network search control module 370 may further receive device status information from device status module 320, search parameters from search parameters repository 350, and a search count from search count repository 360. Based on receiving the network search event detection, the device status information, and the search count information, network search control module 370 may determine a search priority (e.g., in a similar manner as described above with respect to FIGS. 4 and 5). Further, network search control module 370 may search for the preferred network in accordance with the search priority.

Figure 7:
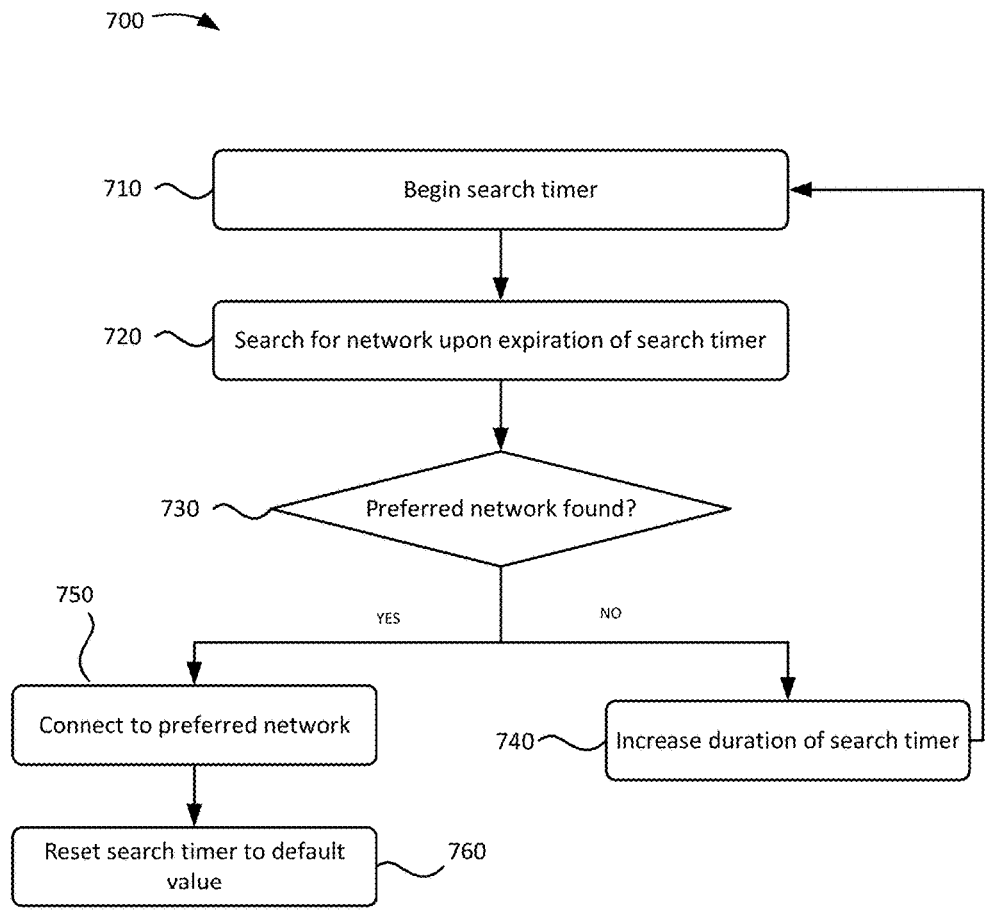
FIG. 7 illustrates a flowchart of an example process 700 for managing timer countdown values implemented by a search timer.

FIG. 7 illustrates a flowchart of an example process 700 for managing timer countdown values implemented by a search timer. In some implementations, process 700 may be performed by user device 210. In some implementations, some or all of blocks of process 700 may be performed by one or more other components or devices.

As shown in FIG. 7 process 700 may include beginning a search timer (block 710). For example, user device 210 may begin a search timer (e.g., an idle search timer or an active search timer, as described above with respect to blocks 415 and 450, respectively). User device 210 may begin the search timer after determining the state of user device 210 (e.g., as described above with respect to block 410 of process 400).

Process 700 may further include searching for the preferred network upon expiration of the search timer (block 720). For example, user device 210 may search for the preferred network upon expiration of the search timer (e.g., as described in blocks 425 and 465 of FIG. 4).

Process 700 may also include determining whether a preferred network has been found (block 730). For example, user device 210 may determine whether a preferred network has been found (e.g., as described above with respect to blocks 430 and 470 of FIG. 4).

If, for example, the preferred network has not been found (block 730-NO), process 700 may include increasing the duration of the search timer (block 740). For example, user device 210 may increase the duration of the search timer by adding to a countdown value implemented by the search timer. Process 700 may return to block 710 so that each time a preferred network is not found after searching for the preferred network, the duration of the search timer can be increased. In some implementations, the duration of the search timer may only be increased after a threshold quantity of searches for the preferred network has been performed.

If, on the other hand, the preferred network has been found (block 730—YES), process 700 may include connecting to the preferred network (block 750). For example, user device 210 may connect to the preferred network (e.g., as described above with respect to blocks 440 and 485 in FIG. 4).

Process 700 may further include resetting the search timers to a default value (block 760). For example, user device 210 may reset the idle and active search timers to default values so that when user device 210 subsequently searches for a preferred network after connecting to an alternate network, user device 210 may implement search timers with the shorter, default values.

Figure 8:
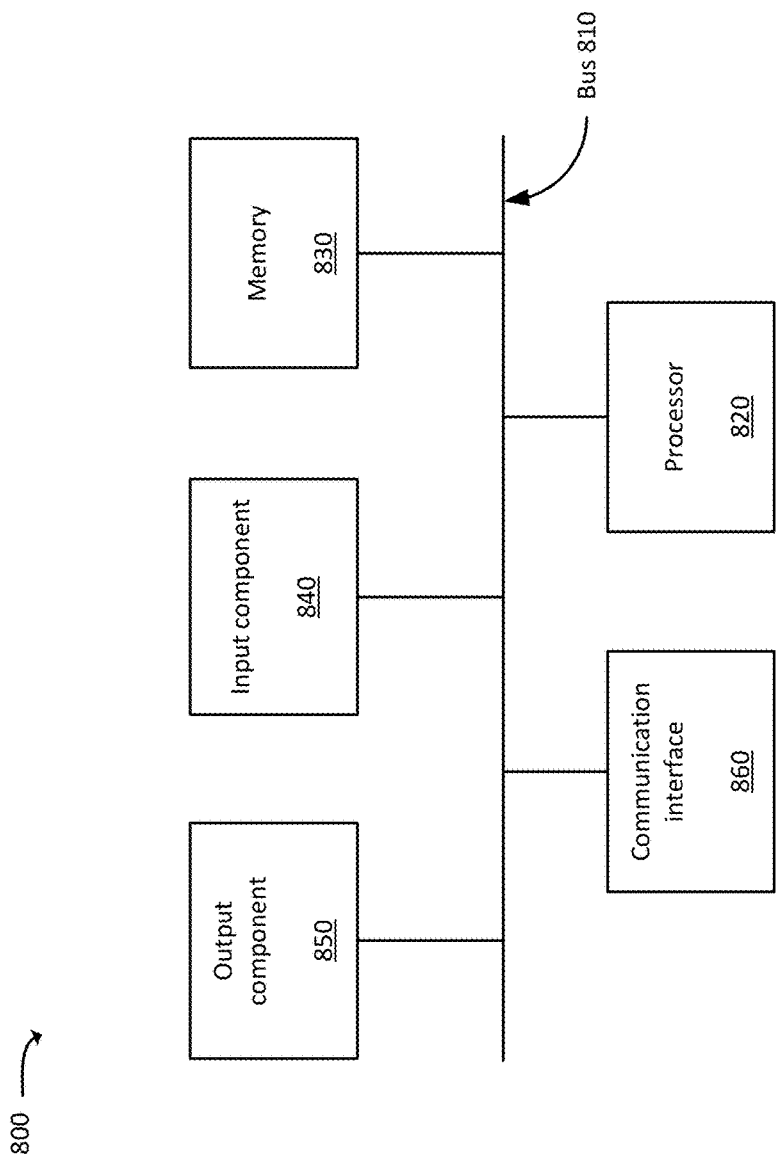
FIG. 8 illustrates example components of one or more devices, according to one or more implementations described herein.

FIG. 8 is a diagram of example components of device 800. One or more of the devices described above (e.g., with respect to FIGS. 1A-1D, 2, 3, and 6) may include one or more devices 800. Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more light emitting diodes ("LEDs"), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as a cellular radio transceiver, an infrared ("IR") receiver, a Bluetooth® radio (Bluetooth is a registered trademark of Bluetooth SIG, Inc.), radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while series of blocks have been described with regard to FIGS. 4, 5, and 7, the order of the blocks may be modified in other implementations. Further, non-dependent blocks may be performed in parallel.

It will be apparent that different examples of the description provided above may be implemented in many different forms of software, firmware, and hardware in the implementations illustrated in the figures. The actual software code or specialized control hardware used to implement these examples is not limiting of the implementations. Thus, the operation and behavior of these examples were described without reference to the specific software code—it being understood that software and control hardware can be designed to implement these examples based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown (e.g., in FIGS. 2, 3, and 7), in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

Some implementations are described herein in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "satisfying" a threshold (or similar terms) may be used interchangeably with "being greater than a threshold," "being greater than or equal to a threshold," "being less than a threshold," "being less than or equal to a threshold," or other similar terms, depending on the context in which the threshold is used.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A user device, comprising:
   a non-transitory memory device storing:
      a plurality of processor-executable instructions; and
   a processor configured to execute the processor-executable instructions, wherein executing the processor-executable instructions causes the user device to:
      determine that the user device should search for a first network when the user device is connected to a second network;
      determine, based on determining that the user device should search for the first network, whether the user device is actively transmitting traffic via the second network;

select a technique, out of a plurality of candidate techniques, in which to search for the first network, the selecting including selecting a first technique when the user device is not actively transmitting traffic via the second network and a second technique when the user device is actively transmitting traffic via the second network;

when the first technique is selected, search, based on determining that the user device should search for the first network, for the first network based on search parameters in order of priority identified in a first prioritized list; and when the second technique is selected, search, based on determining that the user device should search for the first network, for the first network based on search parameters in order of priority identified in a second prioritized list, the first prioritized list and the second prioritized list being separate and different, wherein searching for the first network based on the search parameters in the order of priority identified in the first prioritized list includes searching for the first network for a first duration of time, and wherein searching for the first network based on the search parameters in the order of priority identified in the second prioritized list includes searching for the first network for a second duration of time that is shorter than the first duration of time.

2. The user device of claim 1, wherein executing the processor-executable instructions further causes the user device to:

determine whether the first network been found based on searching for the first network;

increment a counter when the first network has not been found;

connect to the first network when the first network has been found; and reset the counter based on connecting to the first network, wherein a priority of the search parameters in the first prioritized list or the second prioritized list are based on the counter.

3. The user device of claim 1, wherein executing the processor-executable instructions further causes the user device to:

restart a timer based on determining that the first network has not been found; and subsequently search for the first network upon expiration of the timer.

4. The user device of claim 1, wherein executing the processor-executable instructions, to search for the first network further causes the user device to:

start a timer when beginning to search for the first network; and discontinue searching for the first network when the timer expires.

5. The user device of claim 1, wherein executing the processor-executable instructions, to determine that the user device should search for the first network, occurs when a network reselection timer expires.

6. The user device of claim 1, wherein at least one search particular parameter, of the search parameters, of the first or second prioritized lists, is based on at least one of:

an identifier of a particular base station, of the first network, to which the user device was most recently connected, a particular frequency band, associated with the particular base station to which the user device was most recently connected, one or more frequency bands that neighbor the particular frequency, or a priority band table identifying a plurality of frequency bands and a priority of each of the plurality of frequency bands.

7. The user device of claim 1, wherein the second prioritized list is based on a last search parameter based on which the user device previously searched for the first network.

8. The user device of claim 1, wherein the first network corresponds to a Long-Term Evolution (LTE) network, and wherein the second network corresponds to at least one of:

a Code Division Multiple Access 2000 1× network, a second generation network, or a third generation network.

9. A method comprising:

determining, by a user device, that the user device should search for a first network when the user device is connected to a second network;

determining, by the user device and based on determining that the user device should search for the first network, whether the user device is in an active mode, in which the user device is actively transmitting traffic via the second network, or an idle mode in which the user device is not actively transmitting traffic via the second network;

determining, by the user device and based on whether the user device is in the idle mode or the active mode, whether to search for the first network for a first duration of time or a second duration of time;

when the user device is in the active mode, searching for the first network based on search parameters in order of priority identified in a second prioritized list, wherein the first and second prioritized lists are separate and different;

searching, by the user device, based on search parameters in order of priority identified in a first prioritized list, and based on determining that the user device should search for the first network, and when determining that the user device is in the idle mode, for the first network for the first duration of time; and searching, by the user device, based on search parameters in order of priority identified in a second prioritized list that is separate and different from the first prioritized list, and based on determining that the user device should search for the first network, and when determining that the user device is in the active mode, for the first network, for the second duration of time that is shorter than the first duration of time.

10. The method of claim 9, wherein searching for the first network, when determining that the user device is in the idle mode, includes searching for the first network according to a first set of search parameters, and wherein searching for the first network, when determining that the user device is in the active mode, includes searching for the first network according to a second set of search parameters, the first and second sets of search parameters being different.

11. The method of claim 10, further comprising:

determining whether the first network been found based on searching for the first network; and incrementing a counter based on determining that the first network has not been found, wherein a priority of the search parameters in the first set of search parameters or in the second set of parameters is based on a value of the counter.

12. The method of claim 11, further comprising:
restarting a timer based on determining that the first network has not been found; and
subsequently searching for the first network upon expiration of the timer.

13. The method of claim 10, wherein at least one particular search parameter, of the search parameters of the first or second sets of search parameters, is based on at least one of:
an identifier of a particular base station, of the first network, to which the user device was most recently connected,
a particular frequency band, associated with the particular base station to which the user device was most recently connected,
one or more frequency bands that neighbor the particular frequency, or
a priority band table identifying a plurality of frequency bands and a priority of each of the plurality of frequency bands.

14. The method of claim 13, wherein an order of the first set of search parameters or the second set of search parameters is based on a last search parameter based on which the user device previously searched for the first network.

15. The method of claim 9, wherein searching for the first network for the first duration of time includes:
starting a timer when beginning to search for the first network; and
discontinuing searching for the first network when the timer expires.

16. The method of claim 9, wherein determining that the user device should search for the first network, is based on an expiration of a network reselection timer.

17. A non-transitory computer-readable medium storing a set of processor-executable instructions, which, when executed by one or more processors, cause the one or more processors to:
determine that the user device should search for a first network when the user device is connected to a second network;
determine, based on determining that the user device should search for the first network, whether the user device is actively transmitting traffic via the second network;
determine whether the user device is in:
an idle mode in which the user device is not actively transmitting traffic via the second network, or
an active mode in which the user device is actively transmitting traffic via the second network;
select one of (a) a first prioritized list of search parameters, or (b) a second prioritized list of search parameters, wherein the first prioritized list is selected when determining that the user device is in the idle mode, and wherein the second prioritized list is selected when determining that the user device is in the active mode;
search, for a first duration of time and based on determining that the user device should search for the first network, and further based on determining that the user device is in the idle mode, for the first network based on the search parameters in order of priority identified in the first prioritized list; and
search, for a second duration of time that is shorter than the first duration of time, based on determining that the user device should search for the first network, and when the user device is in the active mode, for the first network based on the search parameters in order of priority identified in the second prioritized list, the first prioritized list and the second prioritized list being separate and different.

18. The non-transitory computer-readable medium of claim 17, wherein the processor-executable instructions further include processor-executable instructions, which, when executed by the one or more processors, further cause the one or more processors to:
determine whether the first network been found based on searching for the first network;
increment a counter when the first network has not been found;
connect to the first network when the first network has been found; and
reset the counter based on connecting to the first network, wherein a priority of the search parameters in the first prioritized list or the second prioritized list are based on the counter.

19. The non-transitory computer-readable medium of claim 17, wherein at least one search particular parameter, of the search parameters of the first or second prioritized lists, is based on at least one of:
an identifier of a particular base station, of the first network, to which the user device was most recently connected,
a particular frequency band, associated with the particular base station to which the user device was most recently connected,
one or more frequency bands that neighbor the particular frequency, or
a priority band table identifying a plurality of frequency bands and a priority of each of the plurality of frequency bands.

20. The non-transitory computer-readable medium of claim 17, wherein the processor-executable instructions further include processor-executable instructions, which, when executed by the one or more processors, further cause the one or more processors to:
restart a timer based on determining that the first network has not been found; and
subsequently search for the first network upon expiration of the timer.

* * * * *